(12) United States Patent
Brandon et al.

(10) Patent No.: US 7,851,048 B2
(45) Date of Patent: Dec. 14, 2010

(54) FIBER REINFORCED CORE PANEL

(75) Inventors: Anthony S. Brandon, Moore, SC (US); Ryan W. Johnson, Moore, SC (US); James A. Renninger, Inman, SC (US)

(73) Assignee: Milliken & Co. SC (US)

( * ) Notice: Subject to any disclaimer, the term of this patent is extended or adjusted under 35 U.S.C. 154(b) by 249 days.

(21) Appl. No.: 12/069,722

(22) Filed: Feb. 12, 2008

(65) Prior Publication Data

US 2009/0202776 A1    Aug. 13, 2009

(51) Int. Cl.
*B32B 1/00* (2006.01)
*E04C 2/34* (2006.01)
*B64C 1/00* (2006.01)

(52) U.S. Cl. .................. 428/178; 428/188; 244/123.1; 244/123.12; 52/793.1

(58) Field of Classification Search ............... 428/178, 428/188; 52/793.1; 244/120, 123.1, 123.12, 244/123.13, 123.4, 123.6
See application file for complete search history.

(56) References Cited

U.S. PATENT DOCUMENTS

| | | | |
|---|---|---|---|
| 3,528,875 A | 9/1970 | MacDonald et al. | 161/132 |
| 3,544,417 A | 12/1970 | Corzine | 161/50 |
| 3,996,084 A | 12/1976 | Holmes | 156/93 |
| 4,068,434 A | 1/1978 | Day et al. | 52/220 |
| 4,083,159 A * | 4/1978 | Hatch et al. | 52/309.1 |
| 4,115,610 A * | 9/1978 | Wortman | 428/102 |
| 4,147,004 A | 4/1979 | Day et al. | 52/309.9 |
| 4,463,043 A | 7/1984 | Reeves et al. | 428/68 |
| 4,764,420 A | 8/1988 | Gluck et al. | 428/317.7 |
| 4,774,794 A | 10/1988 | Grieb et al. | 52/309.7 |
| 4,819,608 A | 4/1989 | Filice et al. | 124/23 |
| 5,069,737 A | 12/1991 | Guiton | 156/210 |
| 5,098,778 A | 3/1992 | Minnick | 428/285 |
| 5,192,598 A | 3/1993 | Forte et al. | 428/71 |
| 5,431,996 A | 7/1995 | Giesemann | 428/288 |
| 5,462,623 A | 10/1995 | Day | 156/250 |

(Continued)

FOREIGN PATENT DOCUMENTS

DE    19751516    5/1999

(Continued)

*Primary Examiner*—Donald Loney
(74) *Attorney, Agent, or Firm*—Cheryl J. Brickey

(57) ABSTRACT

A fiber reinforced core panel having a first side and an opposing second side. The core panel contains a series of adjacent low density strips having at least three faces and having a length to width aspect ratio of at least 5:1. The longitudinal axis of the low density strips are substantially parallel and the cross-section of each strip has a major face, a first edge face, and a second edge face. The major face of each strip is disposed within the first or second side of the core panel and the major face of each strip is disposed within an opposite face of the core panel than the major face of the adjacent strips. The core panel also contains a continuous fibrous reinforcement sheet which is threaded through the low density strips such that the fibrous reinforcement sheet is disposed between adjacent strips and adjacent to the major faces of the low density strips. The reinforcement sheet forms at least about sixty five percent (65%) of the surface area of the first side of the core panel and at least about sixty five percent (65%) of the surface area of the second side of the core panel.

20 Claims, 7 Drawing Sheets

U.S. PATENT DOCUMENTS

| | | | |
|---|---|---|---|
| 5,520,976 A | 5/1996 | Giannetti et al. | 428/36.3 |
| 5,589,016 A | 12/1996 | Hoopingarner et al. | 156/87 |
| 5,589,243 A | 12/1996 | Day | 428/56 |
| 5,679,432 A | 10/1997 | Holmquest et al. | 428/71 |
| 5,698,057 A | 12/1997 | Abouzahr et al. | 156/242 |
| 5,773,121 A | 6/1998 | Meteer et al. | 428/117 |
| 5,834,082 A | 11/1998 | Day | 428/56 |
| 5,857,414 A | 1/1999 | Thoman et al. | 105/397 |
| 5,958,325 A | 9/1999 | Seemann, III et al. | 264/510 |
| 6,151,743 A | 11/2000 | Church et al. | 14/73 |
| 6,205,728 B1 | 3/2001 | Sutelan | 52/309.7 |
| 6,217,700 B1 | 4/2001 | Knobel | 156/296 |
| 6,497,190 B1 | 12/2002 | Lewit | 114/357 |
| 6,645,333 B2 | 11/2003 | Johnson et al. | 156/92 |
| 6,676,785 B2 | 1/2004 | Johnson et al. | 156/92 |
| 6,701,683 B2 | 3/2004 | Messenger et al. | 52/309.11 |
| 6,740,381 B2 | 5/2004 | Day et al. | 428/56 |
| 6,824,851 B1 | 11/2004 | Locher et al. | 428/76 |
| 6,972,144 B2 | 12/2005 | Roth et al. | 428/68 |
| 7,056,567 B2 | 6/2006 | O'Neill et al. | 428/71 |
| 7,063,887 B2 | 6/2006 | Kobe et al. | 428/317.9 |
| 7,264,878 B2 | 9/2007 | Miller et al. | 428/408 |
| 2003/0213544 A1 | 11/2003 | Hesch | 156/79 |
| 2004/0053035 A1 | 3/2004 | Haas | 428/311.51 |
| 2004/0247856 A1 | 12/2004 | Sikorski et al. | 428/318.4 |
| 2005/0019549 A1 | 1/2005 | Tai et al. | 428/315.9 |
| 2005/0074593 A1 | 4/2005 | Day et al. | 428/292.1 |
| 2005/0146076 A1 | 7/2005 | Alexander et al. | 264/257 |
| 2006/0148917 A1 | 7/2006 | Radwanski et al. | 521/99 |

FOREIGN PATENT DOCUMENTS

| | | |
|---|---|---|
| EP | 0844929 | 4/2002 |
| WO | WO 97/03828 | 2/1997 |
| WO | WO 01/47706 | 7/2001 |
| WO | WO 2005/018926 | 3/2005 |

\* cited by examiner

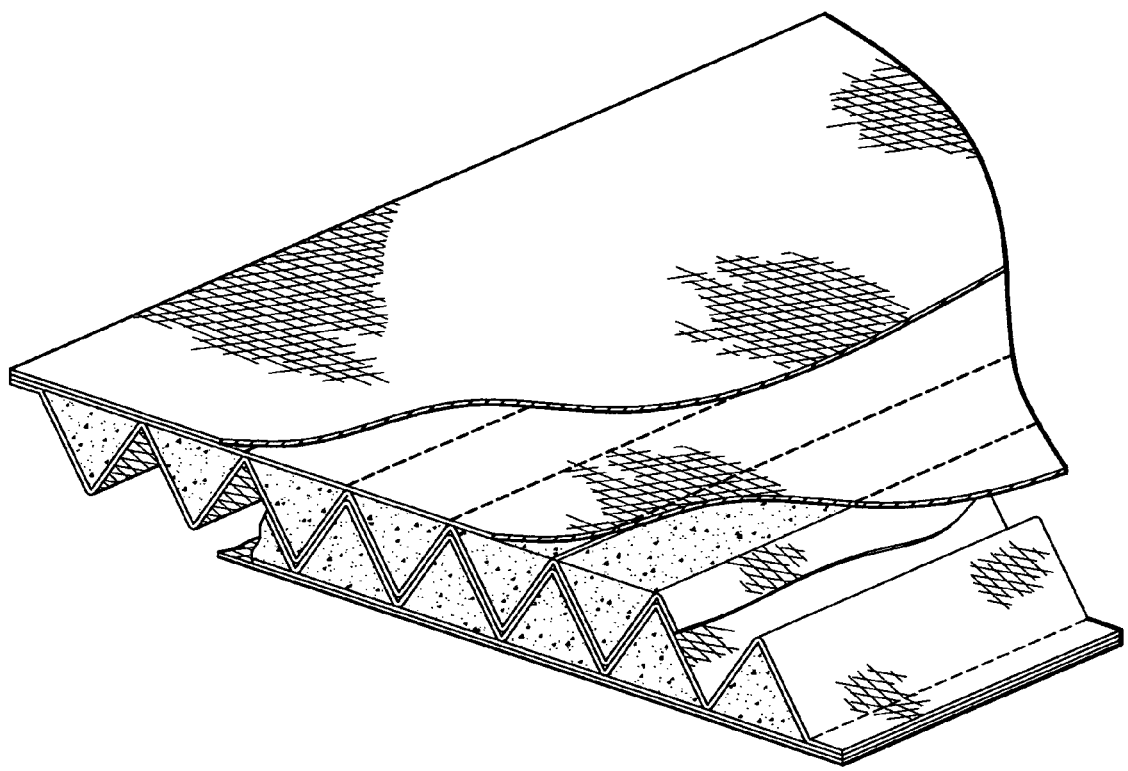
FIG. −1A−
PRIOR ART
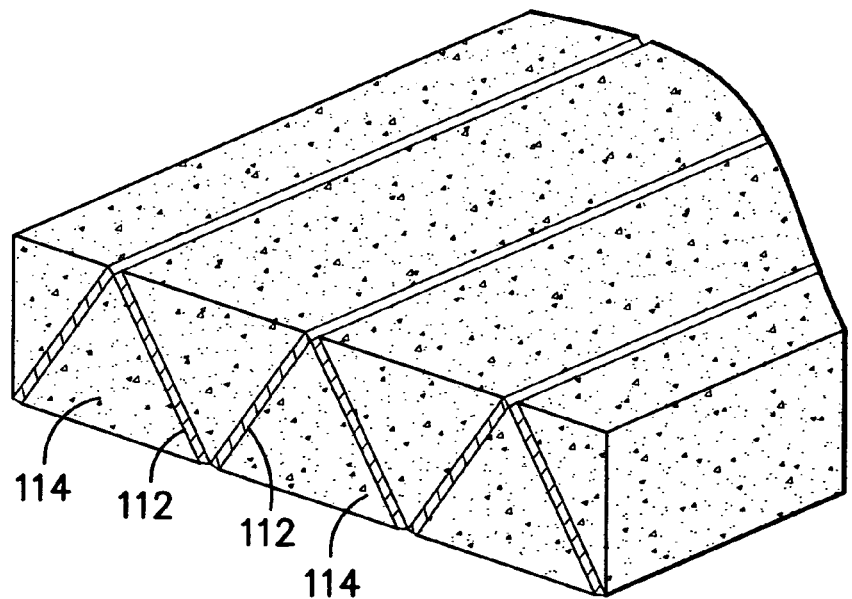
FIG. −1B−
PRIOR ART

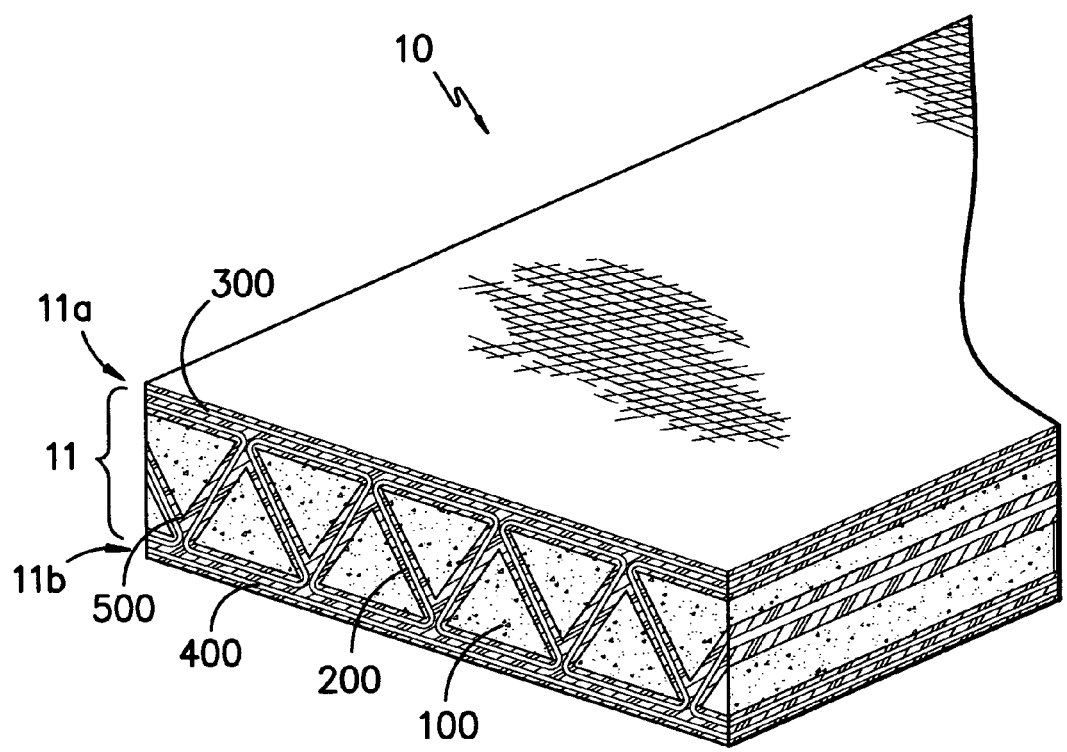
FIG. -2-
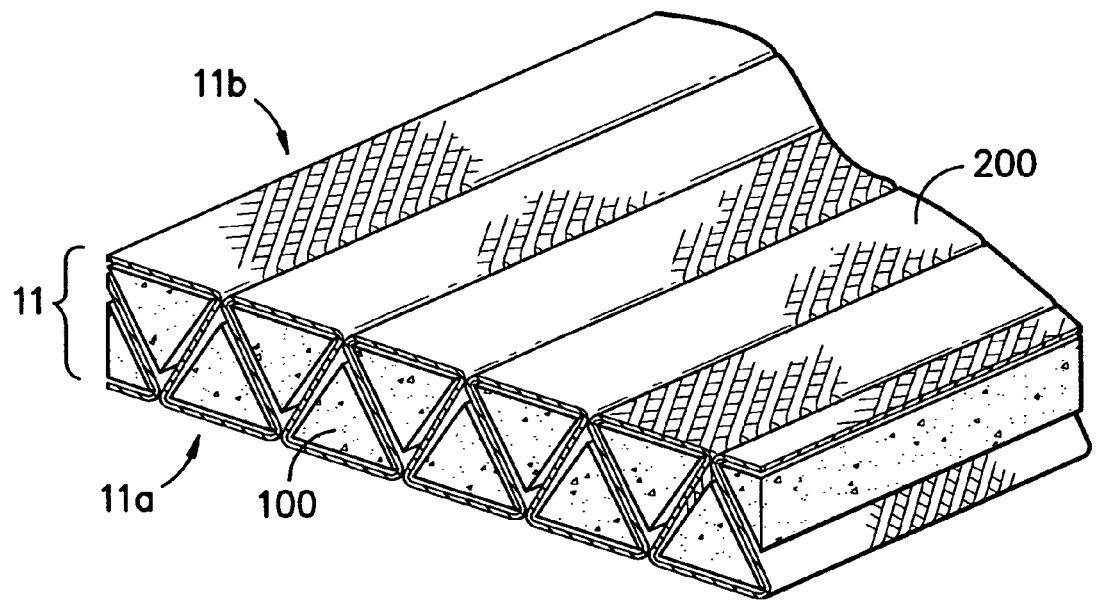
FIG. -3-

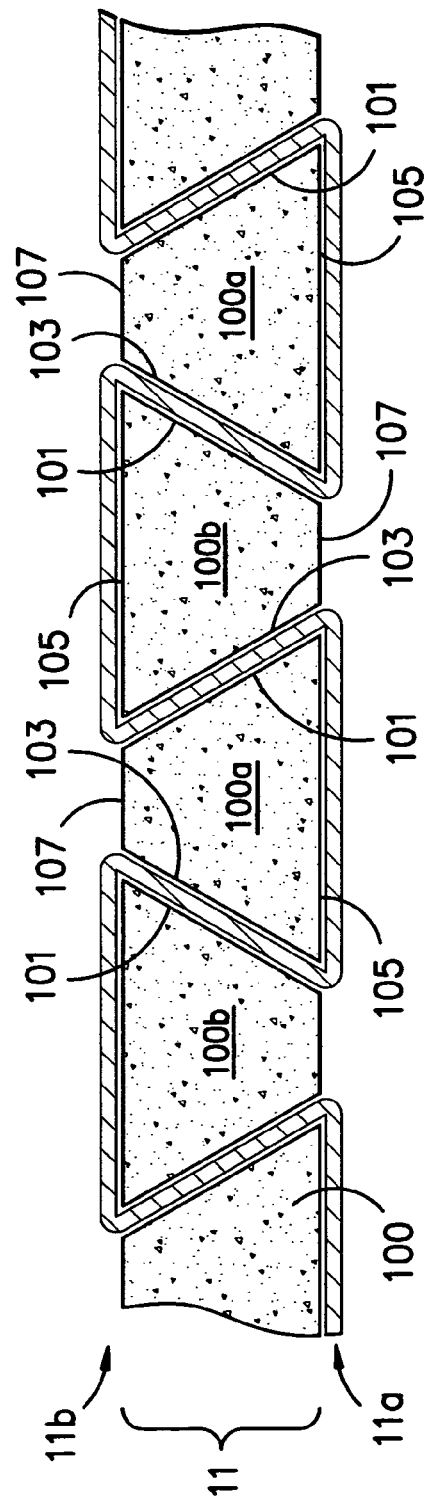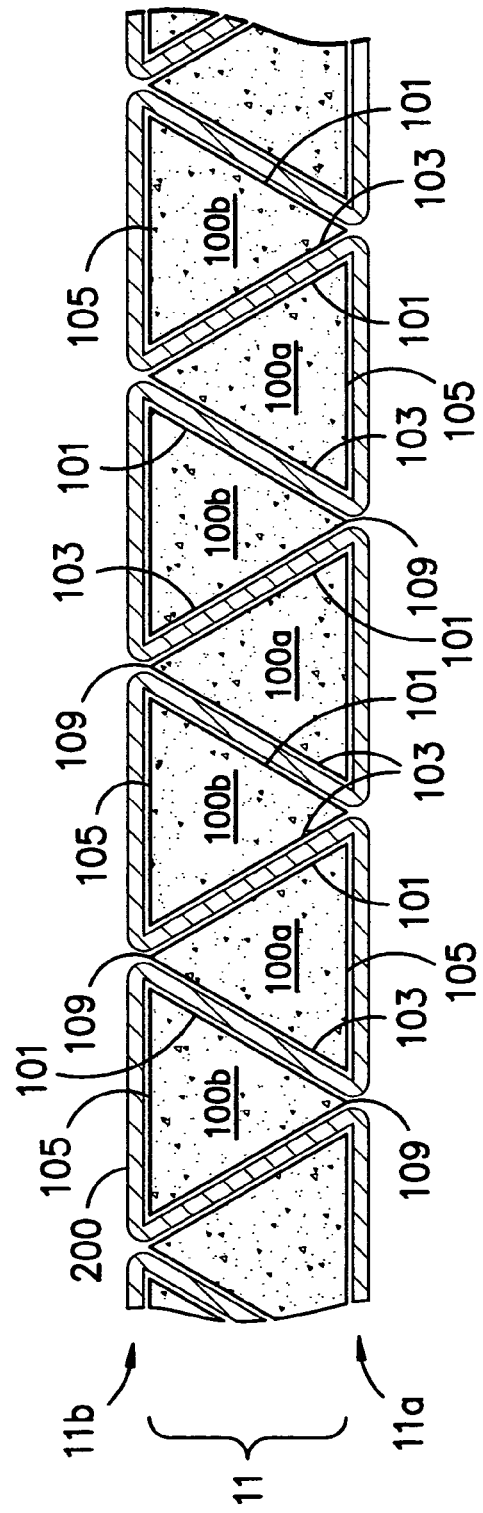

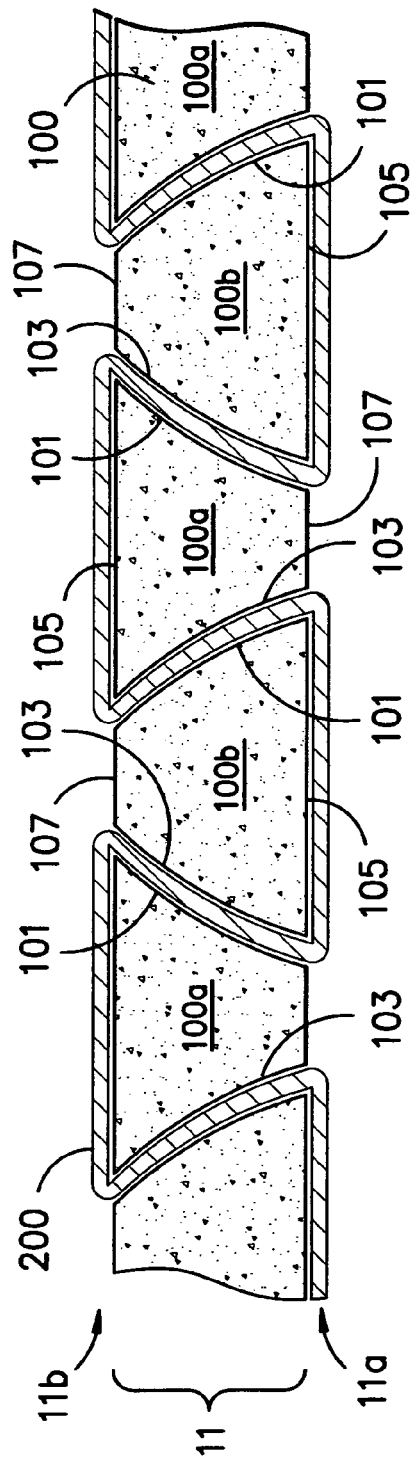
FIG. -6-
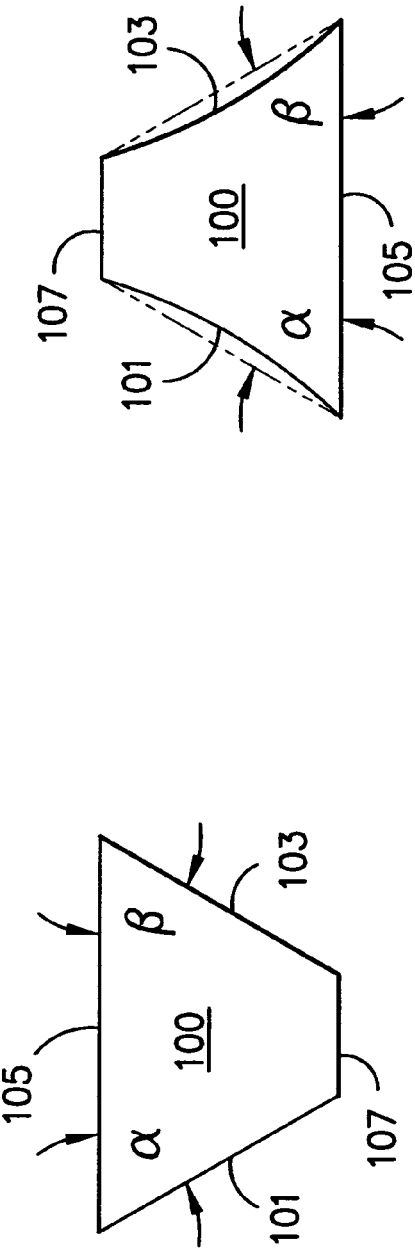
FIG. -7A-
FIG. -7B-

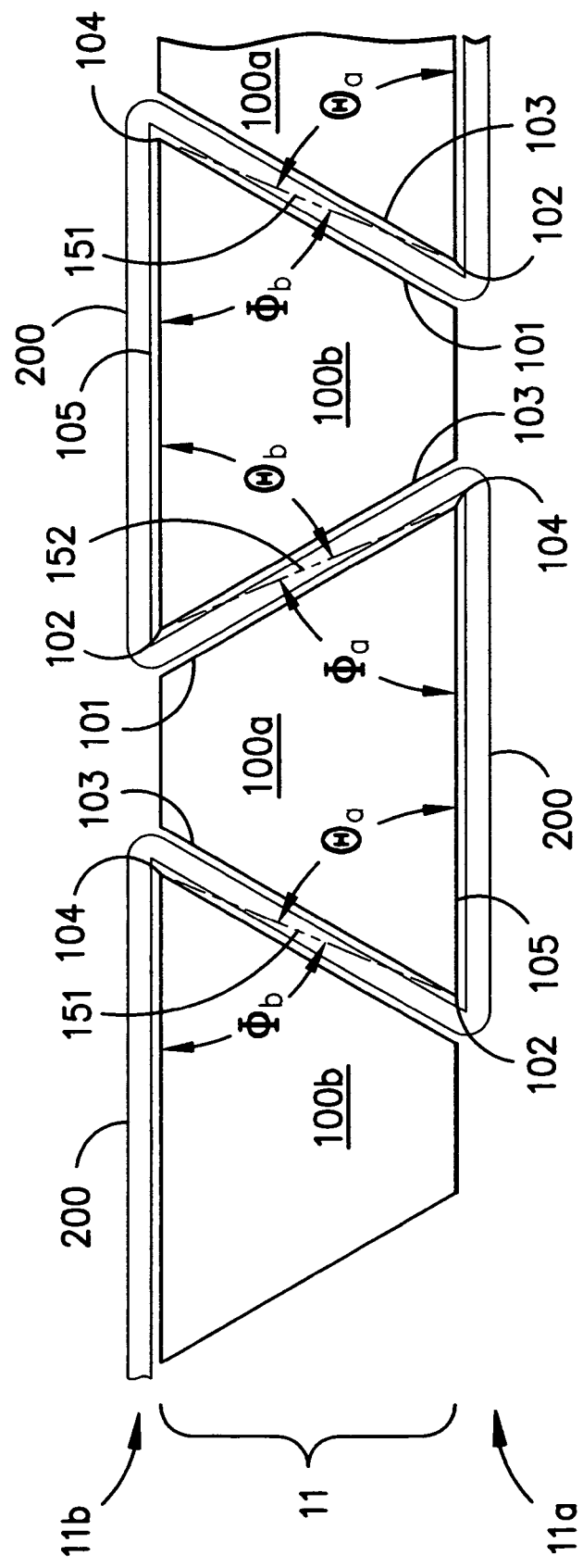
FIG. -7C-

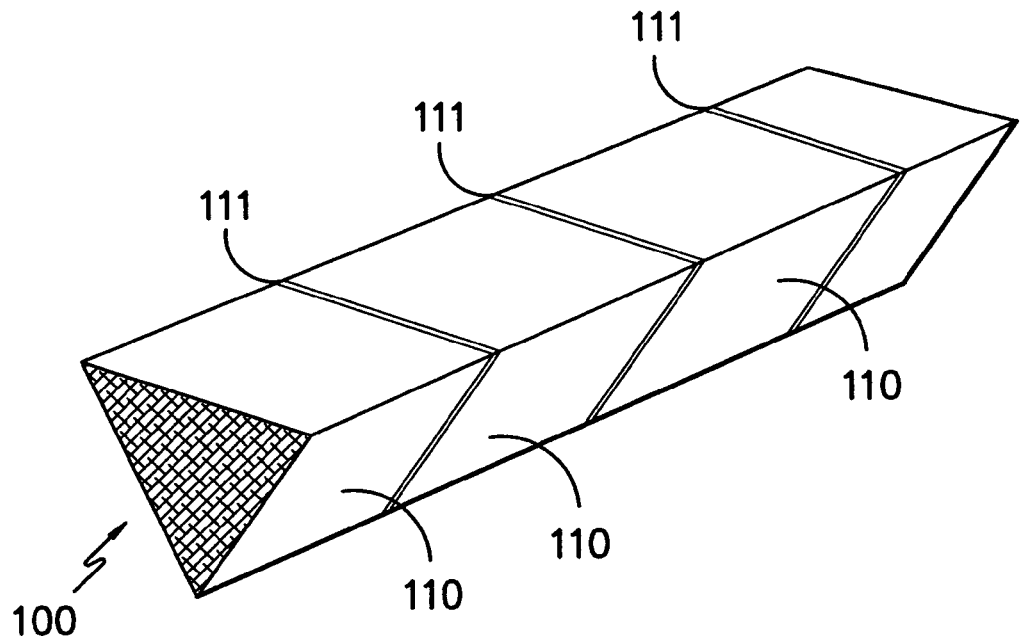
FIG. -8-
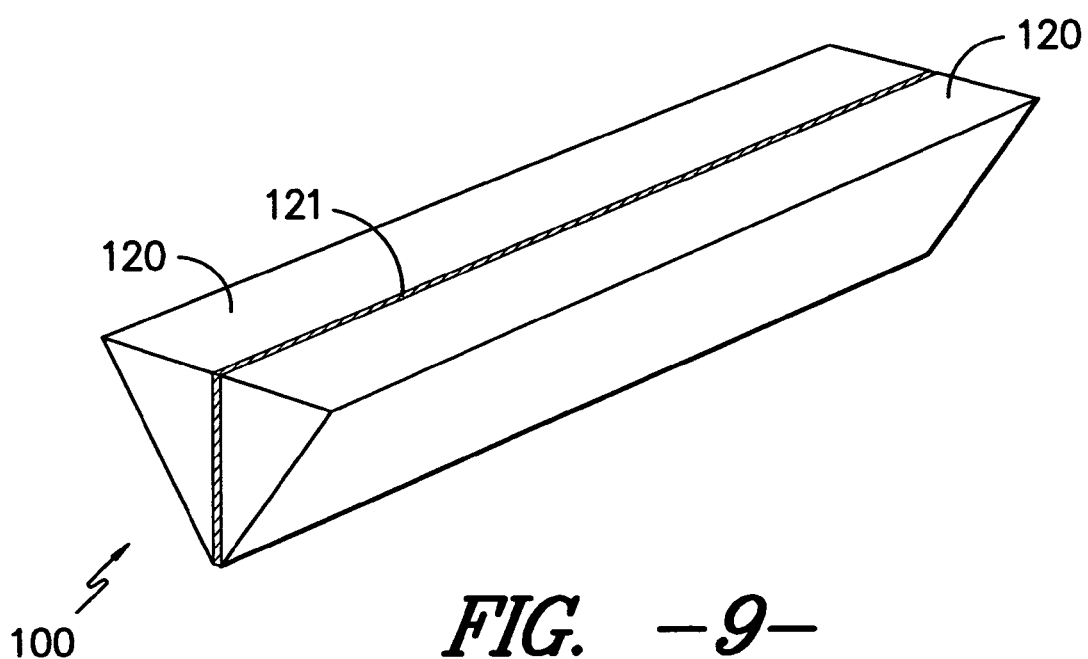
FIG. -9-

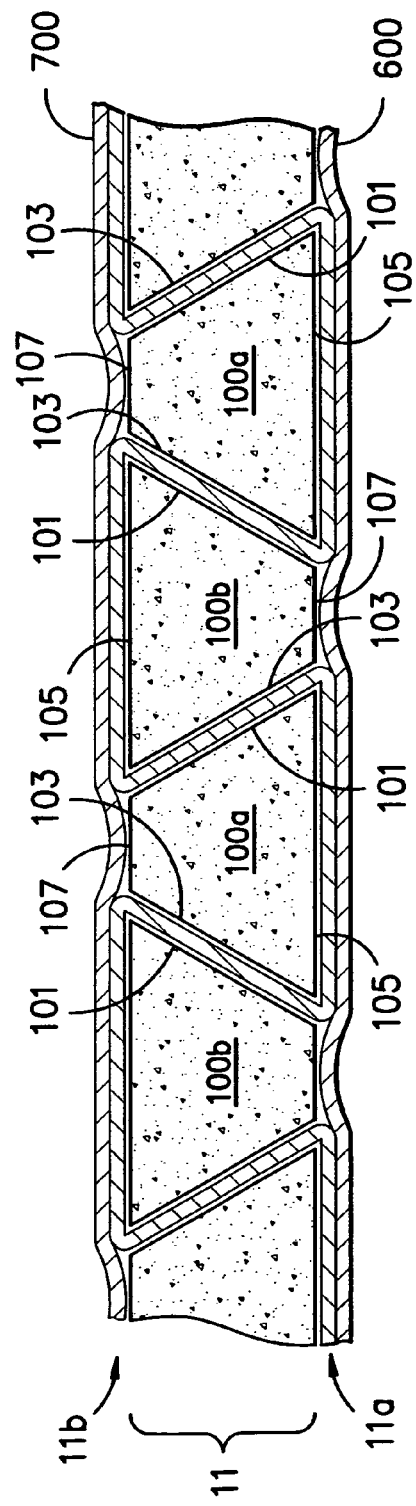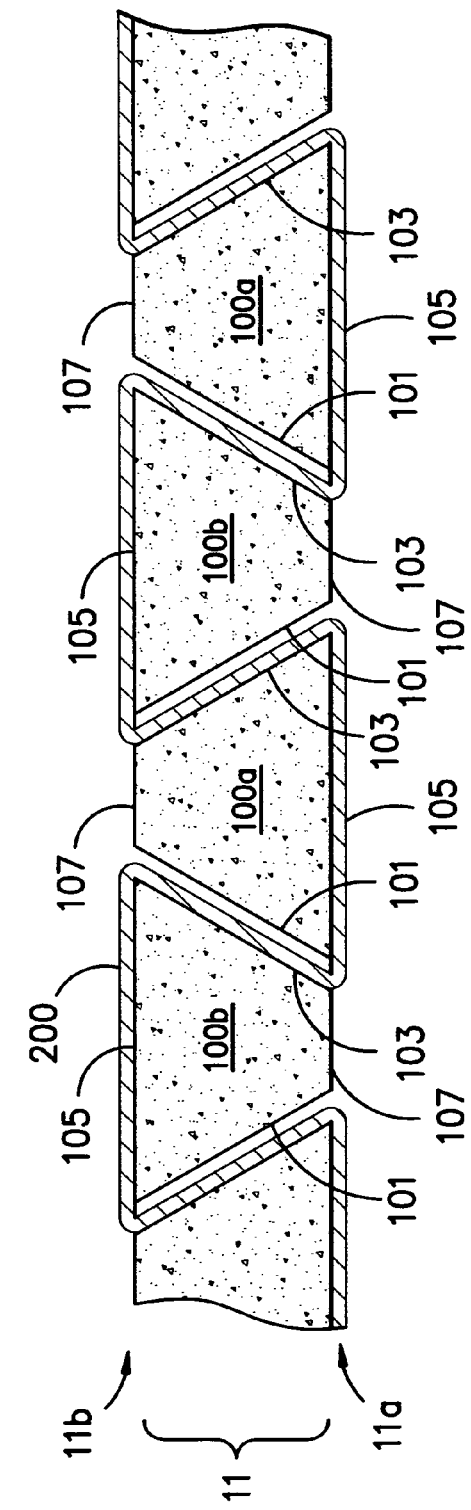

FIBER REINFORCED CORE PANEL

TECHNICAL FIELD

This invention relates generally to composite structures. More particularly, the invention relates to a fiber reinforced core panel having a series of strips wrapped with a fibrous reinforcement sheet and the composite structures made there from.

BACKGROUND

In FIG. 1A, there is shown an embodiment of the prior art that is the subject matter of U.S. Pat. No. 3,544,417, issued on Dec. 1, 1970, to L. H. Corzine, for "Cellular Foam Core Assembly". FIG. 1A illustrates a sandwich assembly formed from two basic cellular foam core structures, one inverted and interengaged downwardly fully with the other.

FIG. 1B illustrates another embodiment of a prior art composite that is the subject manner of U.S. Pat. No. 5,589,243, issued on Dec. 31, 1996 to S. W. Day, for "Reinforced foam cores and method and apparatus of production." FIG. 1B illustrates the end portion of a reinforced foam core panel with longitudinally extending strips or webs 112 separating longitudinally extending foam strips 114. The opposite longitudinal edges of each web 112 are exposed at the side surfaces or faces of the panel.

As can be seen in FIGS. 1A and 1B, the prior art embodiments have a low percentage of surface area of the panel that is covered by a reinforcing sheet. This structure provides poor lamination to the outer skins of the composite resulting in high potential for delaminating between the fiber reinforcing sheet and skin.

Thus, there is a need for a composite structure having excellent adhesion between the panel and skins to form a strong composite structure.

SUMMARY

The present invention provides advantages and/or alternatives over the prior art by providing a fiber reinforced core panel having a first side and an opposing second side. The core panel contains a series of adjacent low density strips having at least three faces and having a length to width aspect ratio of at least 5:1. The longitudinal axes of the low density strips are substantially parallel and the cross-section of each strip has a major face, a first edge face, and a second edge face. The major face of each strip is disposed within the first or second side of the core panel and the major face of each strip is disposed within an opposite face of the core panel than the major face of the adjacent strips. The core panel also contains a continuous fibrous reinforcement sheet which is threaded through the low density strips such that the fibrous reinforcement sheet is disposed between adjacent strips and adjacent to the major faces of the low density strips. The reinforcement sheet forms at least about sixty five percent (65%) of the surface area of the first side of the core panel and at least about sixty five percent (65%) of the surface area of the second side of the core panel.

BRIEF DESCRIPTION OF FIGURES

The present invention will now be described by way of example only, with reference to the accompanying drawings which constitute a part of the specification herein and in which:

FIGS. 1A and 1B are illustrations of prior art.

FIG. 2 is a perspective view of a composite structure according to the invention.

FIG. 3 is a perspective view of a fiber reinforced core panel according to the invention.

FIG. 4 is an end view of one embodiment of a fiber reinforced core panel according to the invention having strips with profiles having 4 faces.

FIG. 5 is an end view of another embodiment of a fiber reinforced core panel according to the invention having strips with profiles having 3 faces.

FIG. 6 is an end view of another embodiment of a fiber reinforced core panel according to the invention having strips with profiles having 4 faces, 2 of which are curved.

FIGS. 7A and 7B are end views of strips having different profiles.

FIG. 7C is an end view of one embodiment of the panel.

FIG. 8 is a profile view of another embodiment of the strip.

FIG. 9 is a profile view of another embodiment of the strip.

FIG. 10 is an end view of another embodiment of a fiber reinforced core panel according to the invention having stabilizing layers on the panel.

FIG. 11 is an end view of another embodiment of the fiber reinforced core panel according to the invention.

DETAILED DESCRIPTION

In contrast to the prior art, the wrapping of the reinforcement sheet around the low density strips in the present invention creates a situation where the angle formed by the fibrous reinforcing sheet when it progresses from a surface of the fibrous reinforcing core panel between the foam strips to the opposing surface of the panel creates a cross sectional view that appears to resemble the letter Z. As a result, greater surface area of the foam strips can be covered by the fibrous reinforcing sheet on the outer surfaces of the fiber reinforcing core panel. The resulting structure not only provides for more surface area to create a bond between the fibrous reinforcing sheet and the outer skin layers to reduce the possibility of delamination, but also positions more of the fibrous reinforcing sheet at the outer surfaces of the fiber reinforcing core to give that structure more strength (such as created by an I-beam). In combination with the greater covering of the low density strip surfaces, this configuration provides an angular progression of the fiber reinforcing sheet through the fiber reinforced core panel to create a truss which will resist compression and shear forces.

Referring now to the Figures, and in particular, to FIG. 2, there is shown a composite structure 10 generally including a plurality of low density strips 100, a continuous fibrous reinforcement sheet 200, a first outer skin 300, a second outer skin 400, and a polymeric matrix 500. The low density strips 100 have longitudinal axes that are substantially parallel to each other. The fibrous reinforcing layer 200 and the low density strips 100 (with additional optional layers and materials) form the fiber reinforced core panel 11. The first outer skin 300 is disposed on a first side 11a of the reinforced core panel 11. The second outer skin 400 is also a flexible material disposed across the second side 11b of the fibrous reinforced core panel 11 opposite from the first outer skin 300. The polymeric matrix 500 is typically a resin material such as a thermoset polymer. However, other polymeric resins could be used such as a thermoplastic or a material polymerized in position. The fiber reinforced core panel 11 is shown in greater detail in FIG. 3.

Referring now to FIG. 3, the low density strips 100 have at least three faces and a length to width aspect ratio of at least about 5:1, preferably at least about 10:1. The low density strips 100 are aligned in the panel 11 such that the longitudinal axes of the low density strips 100 are substantially parallel. The low density strips 100 have a density lower than the polymeric matrix 500, preferably having a density of between about 0.02 and 0.04 g/cm$^3$.

Referring now to FIGS. 4-6, the cross-sectional profile of the low density strips 100(a, b) may have any suitable profile; profiles include, but are not limited to profiles having three or four faces. The faces may be straight or curved. The faces of the strip 100 that are next to the adjacent strips 100 in the core panel 11 are designated as edge faces 101 and 103. The edge faces 101 and 103 preferably mate to the adjacent edge faces 101 and 103 in the adjacent strips as shown in FIGS. 4-6. Having the edge faces 101 and 103 mate creates a high strength composite structure 10. The widest face positioned with a face on the first side 11a or second side 11b of the core panel 11 is designated as the major face 105.

The strips 100 in the core panel 11 are arranged such that they form a relatively flat panel. The strips 100 are flipped relative to the adjacent strips 100 (strips 100a compared to strips 100b) making the major face 105 of a particular strip 100a, b on the opposing side of the core panel 11 compared to the major face 105 of the adjacent strip 100a, b. If the strips are four sided, as shown in the trapezoid profile shaped strips 100 in FIG. 4, the face opposite to the major faces 105 is designated as the minor face 107. The major face 105 and minor face 107 are generally parallel to one another. Preferably, the ratio of lengths of the major to minor faces is about 2:1, more preferably about 7:1. An embodiment of panel 11 where the strips 100 have four faces with two of the faces being curved is shown in FIG. 6. If the strips are three sided, as the triangle shaped strips shown in FIG. 5, there is no minor face and the point or edge opposite the major face 105 is designated as point 109.

Referring to FIGS. 7A and 7B, the angle α formed by the edge face 101 and the major face 105 is preferably acute, meaning that it is less than 90 degrees. Also preferred, the angle β formed by the edge face 103 and the major face 105 is also acute. The sum of angles α and β is less than 180 degrees. If any of the faces 101, 103, 105 are not straight, then to determine the angles α and β one creates an imaginary line connecting the end points of the line as shown in FIG. 7B. The strips may all have the same cross-sectional profile or the profiles and dimensions may vary from one strip to another. In one embodiment of the invention, strips 100 (a,b) with alternating cross-sections (such as a triangle, trapezoid repeat) may be used to create panels that have a natural contour in the finished product. The natural contour allows the panel to drape to a curved mold with minimal gaps between adjacent strips to avoid excess polymeric matrix 500 (resin) pickup. One method of achieving this natural contour is changing the angles in the adjacent cross sections. A greater change in angle between adjacent strips gives a greater contour. Additional contour can be accommodated in the direction of the strips by using flexible foam strips such as polyethylene or polypropylene. Strips 100(a,b) with alternating segments of rigid foam and flexible foam may be used.

The low density strips 100 may be formed from any suitable materials including but not limited to foam (closed-cell or open-cell), balsa wood, and sealed plastic bottles. The foam may be, for example, polyurethane foam, expanded polystyrene foam, expanded polyethylene foam, expanded polypropylene foam, or a copolymer thereof. The strips may be formed of a rigid foam such as PVC, styrene acrylonitrile (SAN), or polymethacrylimide (PMI); a fire resistant foam such as phenolic; or hollow tubes made of plastic, metal, paper, or the like. In a potentially preferred embodiment, the strips 100 are composed of closed-cell foam. The type of closed-cell foam may be selected on the basis of processing parameters such as pressure, temperature, or chemical resistance or other desired panel properties, such as water or fire resistance, thermal insulation or light transmission.

The strips 100 preferably have resin absorption of less than about 250 g/m$^2$ under vacuum pressure as measured by weight change and a deformation of less than 10% under a vacuum of 101 kPa as measured by thickness change. The strips 100 may also have a film or coating on at least one of the surfaces to reduce resin absorption or improve bonding between foam strips and reinforcement. The film or coating may be applied in any known manner and may include PVC, polyolefins, polyurethanes, and other polymers. Low composite structure 10 density is one of the key performance parameters for composite sandwich panels. Resin pickup by foam or other core materials can be significant. Closed cell foams have moderate resin absorption at the surface. Since the amount of foam surface area is increased by 100% to 200% when using elongated foam strips, there is a need in these structures to reduce the surface absorption of resin (polymeric matrix 500). One method this can be achieved is by sealing off the foam strips from the resin supply using a PVC shrink wrap film. Covering the foam strips with an impermeable layer of film serves to reduce the resin pickup in the foam and also serves to minimize the resin content in the truss elements of the invention. Preferably, the surface coating on at least one face of the strips 100 is impervious to resin. Some films and coatings may interfere with adhesion between the foam surface of the strips 100 and the reinforcement sheet 200. Some covering films and coatings may reduce the bonding between the foam and reinforcement. This is not considered a significant issue because the mechanical properties are mainly developed by the reinforcement. Alternatively, the impermeable layer could be chosen to enhance the bond between the low density strips 100 and the reinforcement sheet 200, improving the mechanical properties of the composite structure 10.

The strips 100 can be a unitary material, a collection of pieces, and/or reinforced material. In the embodiment where the strips are collection of pieces, the pieces can be individual free pieces, or pieces held together such as with an adhesive. Referring to FIG. 8, there is shown an embodiment with strip 100 with low density material segments 110 and reinforcing planes 111. The reinforcing planes 111 may be joined to the segments 110 by an adhesive. In one embodiment, the reinforcing planes 111 are a fibrous material with spaces to receive the polymeric matrix and create a stiff plane between the segments 110. If additional mechanical properties are desired in the plate of the structure but oriented perpendicular to the elongated strips, the stabilized reinforced core panel can be further cut into strips perpendicular to the initial foam strips and then wrapped with a second continuous reinforcement sheet.

In another embodiment shown in FIG. 9, the foam strip 100 comprises longitudinal segments 120 separated by longitudinal reinforcing plane 121. The longitudinal segments 120 can be bonded to the longitudinal reinforcing plane 121 by an adhesive. In one embodiment, the reinforcing plane 121 is a glass nonwoven with open spaces for receiving the polymeric matrix and creating a stiff longitudinal plane between segments 120. In a preferred embodiment, the cross sectional configuration of the strip 100 is a triangle, with the reinforcing plane extending from the apex of the triangle to the center of the face opposite the point.

Referring back to FIG. 4, the continuous fibrous reinforcement sheet 200 is threaded through the low density strips 100 such that the fibrous reinforcement sheet 200 is disposed between to the edge faces 101, 103 of the adjacent strips 100 and along the major faces 105 of the low density strips 100. The reinforcement sheet 200 forms at least about sixty five percent (65%) of the surface area of the first side 11a and the second side 11b of the fibrous reinforced core panel 11.

The continuous fibrous reinforcing sheet 200 can be a woven, knit, bonded textile, nonwoven (such as a chopped strand mat), or sheet of strands. The fibrous reinforcing sheet 200 can be unidirectional strands such as rovings and may be held together by bonding, knitting a securing yarn across the rovings, or weaving a securing yarn across the rovings. In the case of woven, knit, warp knit/weft insertion, nonwoven, or bonded the textile can have yarns or tape elements that are disposed in a multi-(bi-or tri-) axial direction. The yarns or fibers of the reinforcing sheet 200 may be, for example, fiberglass, carbon, polyester, aramid, nylon, natural fibers, and mixtures thereof. Preferably, the continuous fibrous reinforcement sheet 200 is a multi-axial knit. A multi-axial knit has high modulus, non-crimp fibers that can be oriented to suit a combination of shear and compression requirements. The fibers may be monofilament, multifilament, staple, tape elements, or a mixture thereof. Glass rovings are preferred due to their low cost, relatively high modulus, and good compatibility with a variety of resins. The fibers used in the reinforcement sheet 200 have a high strength to weight ratio. Preferably the fibers have strength to weight ratio of at least 1 GPa/g/cm$^3$ as measured by standard fiber properties at 23° C. and a modulus of at least 70 GPa.

The reinforcing sheet 200 can also be combined with thermoset or thermoplastic resin before being combined with the foam strips. The resin can either be impregnated in the fibers (prepreg), layered in a film form next to the fiber sheets (such as SPRINT® by Gurit), or intermingled with the reinforcement fibers (TWINTEX® by Saint Gobain). Precombining the resin and reinforcement has the advantage of being used in dry processes with similar skins. These processes typically have higher control over fiber resin ratios and thus the potential for lower weight structures. The process is also more controlled with fewer voids or defects. The downside of these prepreg processes is higher material acquisition costs, controlled storage is often needed, and processing typically requires higher capital outlay (heating, autoclave, etc.).

Referring now to FIG. 7C, the strips 100a and 100b are aligned with the major surfaces 105 of strips 100a in the first side 11a of the panel, and major faces 105 of the strips 100b in the second side 11b of the panel. Each of the major faces 105 have a first major face edge 102 and a second major face edge 104. The fiber reinforced sheet 200 progresses in the first face 11a of the panel 11 along the major face 105 of the strip 100a from the first major face edge 102 to the second major face edge 104. The fiber reinforced sheet 200 then turns to proceed between the strip 100a and the strip 100b until it emerges in the second face 11b of the panel 11 at the first major face edge 102 of the strip 100b. The fiber reinforced sheet 200 then progresses in the first face 11b along the major face 105 of the strip 100b from the first major face edge 102 to the second major face edge 104. The fiber reinforced sheet 200 then progresses between the strip 100b and the next strip 100a until it emerges from the panel 11 in the first face 11a at the first major face edge 102 of the strip 100a. This progression is repeated continuously down the length of the panel 11.

One important element of the configuration of present invention is the angle between the point in which the reinforcing fiber sheet 200 begins traveling between the strips 100a and 100b until it reaches its exit point at the opposite side of the panel 11. To illustrate this angle, the first imaginary line 151 is drawn from the second major face edge 104 of strip 100b and the first major face edge 102 of the strip 100a. A second imaginary line 152 is drawn from the second major face edge 104 of strip 100b and the first major face edge 102 of the strip 100b. The angle between the first imaginary line 151 and the major face 105 of the strip 100a is $\Theta_a$, and the angle between the major face 105 of strip 100a to the second imaginary line 152 is $\Phi_a$ the angle between the major face 105 of strip 100b and the second imaginary line 152 is $\Theta_b$, and the angle between the major face 105 of strip 100b and the first imaginary line 151 is $\Phi_b$. By choosing angles $\Theta_b$ and $\Theta_a$ such that they add up to less than 180 degrees, the configuration of the invention can be accomplished. Likewise, by selecting angles $\Phi_a$ and $\Phi_b$ to add up less than 180, the configuration of the invention can be accomplished. This configuration is also facilitated when the angles $\Theta_a$ and $\Phi_a$ add up to be less than 180 degrees and when the angles $\Theta_b$ and $\Phi_b$ also add up to be less than 180 degrees. In order to design a panel 11 that curves about the first surface 11a, and angles $\Theta_a$ and $\Phi_a$ add up to be less than the sum of angles $\Theta_b$ and $\Phi_b$. In order to accomplish a curve of the panel 11 above the second surface 11b, the angles $\Theta_b$ and $\Phi_b$ add to be greater than the sum of angle $\Theta_a$ and $\Phi_a$.

To form the wrapped configuration of the panel 11, the reinforcing sheet 200 is positioned across the edge face 101, moves across the major face 105, then the edge face 103 of a first strip (which is also the edge face 101 of the adjacent strip). The reinforcement fabric 200 continues around the major face 105 of the adjacent strip and then the edge face 103 (which is also the edge face 101 of the next strip). This progression is repeated along the length of the fiber reinforcing core panel 11 to create a situation where the fiber reinforcing sheet 200 covers the surfaces 101, 105, 103 of the strips 100. The reinforcement sheet forms at least about sixty five percent (65%) of the surface area of the first side 11a and the second side 11b of the core panel 11 and provides angular support between the first surface 11a and the second surface 11b. Additionally, the surface area of the major faces 105 covered by the reinforcing sheet 200 will be greater than the surface area of the minor faces 107, if there are minor surfaces. In a second embodiment, the fibrous reinforcing sheet 200 covers at least about eighty percent (80%), or preferably at least about ninety percent (90%), of the surface area of the first 11a and second 11b side of the panel 11.

The strips 100 and reinforcing sheet 200 of fiber reinforcing core panel 11 at times may need to be secured prior to assembly with the other components of the composite structure 10. Referring now to FIG. 10, the fiber reinforced core panel 11 is secured by the addition of a first face stabilizer 600 secured to the reinforcing sheet 200 and strips 100 across the first surface 11a of the fiber reinforcing core panel 11. Additionally, a second face stabilizer 700 may be secured to the reinforcing sheet 200 and strips 100 across the second surface 11b of the fiber reinforcing core panel 11. The second stabilizing layer 700 may be made of the same or different materials and construction as the first stabilizing layer 600. Typically, the face stabilizers 600 and 700 are of very open fabric, such as a scrim. The stabilizing layers 600, 700 may also be fibrous layers, unidirectional fibers, a thermoplastic film, an adhesive layer, or mixtures thereof. An adhesive material may be used to secure the face stabilizers 600, 700 to the strips 100 and reinforcing sheet 200. The adhesive material may be an additional layer added between the stabilizing layer and the panel 11 or may be incorporated into the stabilizing layer 600, 700. In one embodiment, the face stabilizer 600, 700 can be a film, preferably with open apertures to allow flow of the resin matrix 500 throughout the composite structure 10 prior to setting the resin matrix 500. The face stabilizer 600, 700 restricts rotation and movement of the fiber reinforced core structure other than rotation about the axis of the strips. The face stabilizers are an open material, with low surface area, and are preferably a light weight material, such as lighter than the outer skin layers 300, 400.

In another embodiment, the integrity of the fiber reinforced core panel 11 is created by bonding the reinforcing sheet 200 to the strips 100 prior to disposing the polymeric matrix in the composite structure 10. In such an embodiment, the reinforcement sheet can be secured to the strips 100 with an adhesive, and the adhesive can be disposed in a pattern such as stripes or dots to leave a portion of the reinforcing fabric 200 open. In another embodiment, the reinforcement sheet can be secured to the strips through the inclusion of a nonwoven adhesive web.

Referring now to FIG. 11, in one embodiment, the strips 100 and the reinforcing sheet 200 are secured to form a fiber reinforcement core panel 11 in a manner that can allow the core panel 11 to bend in either the direction of the first side 11a or the second side 11b. In this embodiment, the reinforcing sheet 200 is secured to the major face 105 and the edge face 103 of each of the strips 100. The edge face 101 is left unbonded. In this matter, the fiber reinforcing core panel 11 can hinge between the edge face 103 and the major face 105, so that the fiber reinforced core panel 11 can bend into an arc or angle.

Referring back to FIG. 2, the composite structure 10 includes a first outer skin 300 and a second outer skin 400. The first outer skin 300 may be made of the same or different materials and/or constructions compared to the second outer skin 400. The skins may be made up of one or more than one layers of fibers. Preferably, the outer skin layers are made up of at least two layers of fibers. Any suitable fiber may be used in the outer skins 300, 400, including but not limited to organic or inorganic structural reinforcing fabrics such as fiberglass, carbon fibers, aramid fibers such as is available under the name KEVLAR®, linear polyethylene or polypropylene fibers such as is available under the name SPECTRA®, thermoplastic tape fibers, polyester fibers, nylon fibers, or natural fibers. The materials and constructions may also vary between the layers in the skins 300, 400.

The outer skin layers 300, 400 may contain layers of woven, knit, bonded textile, nonwoven fibers, or sheet of strands such as rovings. The fibrous reinforcing sheet can be unidirectional strands such as rovings, and the unidirectional strands can be held together by bonding, knitting a securing yarn across the rovings, or weaving a securing yarn across the rovings. In the case of woven, knit, warp knit/weft insertion, nonwoven, or bonded the textile can have yarns or tape elements that are disposed in a multi-(bi-or tri-) axial direction. The yarns or fibers of the reinforcing sheet can be fiberglass, carbon, polyester, aramid, natural fibers, and mixtures thereof. Preferably, the continuous fibrous reinforcement sheets are a multi-axial knit. A multi-axial knit has high modulus, non-crimp fibers that can be oriented to suit a combination of shear and compression requirements. The fibers may be monofilament, multifilament, staple, tape elements, or a mixture thereof.

In one embodiment, a composite panel 10 can be made from two or more adjacent reinforced core panels 11. The reinforced core panels 11 can be arranged with the strips 100 in each panel 11 parallel to one another or turned at 90 degrees to one another. An additional layer of reinforcement like as used in the outer skins 300, 400 may be added between the reinforced core panels 11. Outer skin layers 300 and 400 are then added to the top and bottom of the reinforced core panels 11.

The composite structure 10 is impregnated or infused with a polymeric matrix 500 of resin which flows, preferably under differential pressure, through at least a portion of (the reinforcing sheet 200, the outer skins 300, 400, and optional stabilizing layers 600, 700). Preferably, the resin flows throughout all of the reinforcing materials (the reinforcing sheet 200, the outer skins 300, 400, and optional stabilizing layers 600, 700) and cures to form a rigid, load bearing structure. Resin such as a polyester, a vinylester, an epoxy resin, a bismaleimide resin, a phenol resin, a melamine resin, a silicone resin, or thermoplastic monomers of PBT or Nylon etc. may be used. Vinylester is preferred due to its moderate cost, good mechanical properties, good working time, and cure characteristics. The reinforcement fabric can also be combined with resin before wrapping around the foam strips. Resins include b-staged thermosets as in thermoset prepregs or thermoplastic resins as in tape yarns, commingled yarns, or unidirectional sheets.

Flowing the resin throughout the porous reinforcing fibers under differential pressure may be accomplished by processes such as vacuum bag molding, resin transfer molding or vacuum assisted resin transfer molding (VARTM). In VARTM molding, the core and skins are sealed in an airtight mold commonly having one flexible mold face, and air is evacuated from the mold, which applies atmospheric pressure through the flexible face to conform the composite structure 10 to the mold. Catalyzed resin is drawn by the vacuum into the mold, generally through a resin distribution medium or network of channels provided on the surface of the panel, and is allowed to cure. The composite structure 10 may have flow enhancing means such as, but not limited to: grooves or channels cut into the major and minor surfaces of the strips; a network of grooves on all sides of the strips; additional elements in the reinforcement fabric such as voids or flow enhancing yarns. Additional fibers or layers such as surface flow media can also be added to the composite structure to help facilitate the infusion of resin. A series of thick yarns such as heavy rovings or monofilaments can be spaced equally apart in one or more axis of the reinforcement to tune the resin infusion rate of the composite panel. In one example polyester monofilaments were spaced about 20 mm apart along the length of the reinforcement sheet. The sheet was then wrapped around the foam strips and infused with resin in the direction of the foam strips. The infusion rate was noticeably faster than when using reinforcement without the added monofilaments.

EXAMPLE

A fiber reinforced core panel and composite structure were made according to the following procedure. Sixteen inch long strips of closed cell foam made of polyurethane with 1 inch height, 1.25 inch width major side, 0.125 inch minor side and a trapezoid shape were obtained. The angles of the trapezoid were 60 degrees from the base to the adjacent sides. The strips had a 65 gram/m$^2$ glass fiber nonwoven facer on the major and minor sides. The trapezoid shaped profile had 2 faces that were parallel to one another. The longer of these faces was designated as the major face and the shorter was designated the minor face. The other two faces were designated the edge faces.

The strips were laid side by side with their longitudinal axes aligned such that the major face alternated between facing upwards and downwards every other strip. The edge faces of the strips were next to the edge faces of strips adjacent to that strip.

A continuous fibrous reinforcing sheet made of E-glass rovings in a 12 oz/yd$^2$ double bias (+/−45 degree) construction (EBX1200® from Vectorply Corporation) was threaded through the strips. The reinforcing sheet was threaded such that the reinforcing sheet was adjacent to the edge faces and the major face such as shown in FIG. 3. This formed the fiber reinforced core panel.

Stabilizing layers were added to either side of the panel to hold the strips and reinforcing sheet in place until the next operation. The stabilizing layers were lightweight fiberglass scrims (STABILON® from Milliken & Company). The stabilizing layers were applied using a lightweight hotmelt non-woven adhesive (PA1541 A/1® from Spunfab).

Next, outer skin layers comprised of 4 layers of E-glass rovings in a 12 oz/yd2 double bias (+/−45 degree) construction (EBX1200® from Vectorply Corporation) were laid on either side of the panel.

Finally, the panel with the outer skins was placed in a mold and secured under a vacuum bag. The air was evacuated and a catalyzed vinyl ester resin (CCP ARMORSTAR IVE-XC400® available from Composites One, LLC) was infused throughout the core panel and outer skins until there were no obvious air voids.

The mold was released from the composite structure. The resultant sandwich structure would be useful in applications such as wind turbine blades, boat decks, train floors or other structures were high stiffness and low weight are valued.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations as may incorporate the broad aspects of the present invention within the full spirit and scope of the invention.

What is claimed is:

1. A fiber reinforced core panel having a first side and an opposing second side comprising:
    a series of adjacent low density strips having at least three faces and having a length to width aspect ratio of at least 5:1, wherein the longitudinal axis of the low density strips are substantially parallel, wherein the cross-section of each strip has a major face, a first edge face, and a second edge face, wherein the major face of each strip is disposed within the first or second side of the core panel, wherein the major face of each strip is disposed within an opposite face of the core panel than the major face of the adjacent strips;
    a continuous fibrous reinforcement sheet, wherein the continuous fibrous reinforcement sheets is threaded through the low density strips such that the fibrous reinforcement sheet is disposed between adjacent strips and adjacent to the major faces of the low density strips, wherein the reinforcement sheet forms at least about sixty five percent (65%) of the surface area of the first side of the core panel and at least about sixty five percent (65%) of the surface area of the second side of the core panel, wherein the reinforcement sheet is not continuous on the first side or second side of the core panel, and wherein the continuous fibrous reinforcement sheet is bonded to the low density strips with an adhesive.

2. The fiber reinforced core panel of claim 1, wherein the reinforcement sheet forms at least about eighty percent (80%) of the surface area of the first side of the core panel and at least about eighty percent (80%) of the surface area of the second side of the core panel.

3. The fiber reinforced core panel of claim 1, wherein the reinforcement sheet forms at least about ninety percent (90%) of the surface area of the first side of the core panel and at least about ninety percent (90%) of the surface area of the second side of the core panel.

4. The fiber reinforced core panel of claim 1, wherein the low density strips comprise closed cell foam.

5. The fiber reinforced core panel of claim 1, wherein the continuous fibrous reinforcement sheet comprises a multi-axial knit fabric.

6. The fiber reinforced core panel of claim 1, wherein the continuous fibrous reinforcement sheet comprising at least one layer of generally parallel rovings.

7. The fiber reinforced core panel of claim 1, further comprising a stabilizing layer on at least one of the first and second sides of the fiber reinforced core panel.

8. The fiber reinforced core panel of claim 1, further comprising an outer skin located on at least one of the first and second sides of the fiber reinforced core panel.

9. The fiber reinforced core panel of claim 8, wherein the stabilizing layer is selected from the group consisting of fibrous strands, a scrim, unidirectional fibers, a thermoplastic film, and an adhesive layer.

10. The fiber reinforced core panel of claim 1, wherein the outer skin is a multi-axial knit fabric.

11. The fiber reinforced core panel of claim 1, wherein the low density strips contain an included angle defined as the angle in the strip created by a first line formed by connecting the ends of one edge face and a second line formed by the major face of the low density strips, wherein the included angle is less than 90 degrees.

12. The fiber reinforced core panel of claim 1, wherein the low density strips contain:
    a first included angle defined as the angle in the strip created by a first line formed by connecting the ends of the first edge face and a second line formed by the major face of the low density strips;
    a second included angle defined as the angle in the strip created by a third line formed by connecting the ends of the second edge face and a forth line formed by the major face of the low density strips;
    wherein the sum of the first included angle and second included angle is less than 180 degrees.

13. The fiber reinforced core panel of claim 1, wherein the low density strips comprise a surface coating on at least one face of the low density strips.

14. The fiber reinforced core panel of claim 13, wherein the surface coating is impervious to resin.

15. A composite structure comprising:
    a series of adjacent low density strips having at least three faces and having a length to width aspect ratio of at least 5:1, wherein the longitudinal axis of the low density strips are substantially parallel, wherein the cross-section of each strip has a major face, a first edge face, and a second edge face, wherein the major face of each strip is disposed within the first or second side of the core panel, wherein the major face of each strip is disposed within an opposite face of the core panel than the major face of the adjacent strips;

a continuous fibrous reinforcement sheet, wherein the continuous fibrous reinforcement sheets is threaded through the low density strips such that the fibrous reinforcement sheet is disposed between adjacent strips and adjacent to the major faces of the low density strips, wherein the reinforcement sheet forms at least about sixty five percent (65%) of the surface area of the first side of the core panel and at least about sixty five percent (65%) of the surface area of the second side of the core panel, wherein the reinforcement sheet is not continuous on the first side or second side of the core panel;

a first outer skin layer located on the first side of the fiber reinforced core panel;

a second outer skin layer located on the second side of the fiber reinforced core panel; and, a resin impregnating at least a portion of one of the first outer skin, the second outer skin layer, and the continuous fibrous reinforcement sheet.

16. The composite structure of claim 15, wherein the resin impregnates at least a portion of the first outer skin, the second outer skin layer, and the continuous fibrous reinforcement sheet.

17. The composite structure of claim 15, wherein the reinforcement sheet forms at least about eighty percent (80%) of the surface area of the first side of the core panel and at least about eighty percent (80%) of the surface area of the second side of the core panel.

18. The composite structure of claim 15, wherein the reinforcement sheet forms at least about ninety percent (90%) of the surface area of the first side of the core panel and at least about ninety percent (90%) of the surface area of the second side of the core panel.

19. The composite structure of claim 15, wherein the low density strips have a surface coating on at least one face.

20. The composite structure of claim 15, wherein the low density strips contain an included angle defined as the angle in the strip created by a first line formed by connecting the ends of one edge face and a second line formed by the major face of the low density strips, wherein the included angle is less than 90 degrees.

* * * * *